US009921364B2

(12) United States Patent
Boulanger et al.

(10) Patent No.: US 9,921,364 B2
(45) Date of Patent: Mar. 20, 2018

(54) LIGHTING ARRANGEMENT

(71) Applicant: CP IP Holdings Limited, Central Hong Kong (CN)

(72) Inventors: Dave Boulanger, Hong Kong (CN); Maciej Nowakowski, West Vancouver (CA)

(*) Notice: Subject to any disclaimer, the term of this patent is extended or adjusted under 35 U.S.C. 154(b) by 154 days.

(21) Appl. No.: 14/986,760

(22) Filed: Jan. 4, 2016

(65) Prior Publication Data
US 2016/0195669 A1 Jul. 7, 2016

Related U.S. Application Data

(60) Provisional application No. 62/099,492, filed on Jan. 3, 2015.

(51) Int. Cl.
| | |
|---|---|
| *F21V 15/00* | (2015.01) |
| *F21V 8/00* | (2006.01) |
| *H05B 33/08* | (2006.01) |
| *F21V 21/03* | (2006.01) |
| *F21S 8/04* | (2006.01) |
| *F21V 23/00* | (2015.01) |
| *F21V 7/05* | (2006.01) |
| *F21V 15/01* | (2006.01) |

(Continued)

(52) U.S. Cl.
CPC .............. *G02B 6/0051* (2013.01); *F21S 8/04* (2013.01); *F21V 15/00* (2013.01); *F21V 21/03* (2013.01); *G02B 6/0073* (2013.01); *H05B 33/0884* (2013.01); *F21V 7/05* (2013.01); *F21V 15/01* (2013.01); *F21V 23/003* (2013.01); *F21V 23/006* (2013.01); *F21V 23/02* (2013.01); *F21Y 2103/33* (2016.08); *F21Y 2115/10* (2016.08)

(58) Field of Classification Search
None
See application file for complete search history.

(56) References Cited

U.S. PATENT DOCUMENTS

| | | | |
|---|---|---|---|
| 7,273,983 | B1 | 9/2007 | Rintz |
| 8,376,777 | B2 | 2/2013 | Smith |

(Continued)

FOREIGN PATENT DOCUMENTS

| | | |
|---|---|---|
| CA | 2586494 A1 | 10/2007 |
| CA | 2754514 A1 | 4/2012 |

(Continued)

OTHER PUBLICATIONS

European Search Report for application No. 16150077.2, dated May 23, 2016, 10 pgs.

(Continued)

*Primary Examiner* — Britt D Hanley

(57) ABSTRACT

A lighting arrangement can include a casing, a mounting bracket, a plurality of light emitting diodes, and a driving circuit. The casing can have a perimeter wall extending about a central axis and bottom lip projecting from the perimeter wall. The mounting bracket can be configured to be affixed to a ceiling. A cavity can be defined vertically between the bottom lip and the mounting bracket and defined radially by the perimeter wall. The driving circuit can be configured to power the plurality of light emitting diodes with AC power. The driving circuit can be transformer-less and include a powering circuit portion electronically communicating with the plurality of light emitting diodes. The driving circuit is disposed in the cavity.

12 Claims, 6 Drawing Sheets

(51) Int. Cl.
*F21V 23/02* (2006.01)
*F21Y 115/10* (2016.01)
*F21Y 103/33* (2016.01)

(56) References Cited

U.S. PATENT DOCUMENTS

| | | |
|---|---|---|
| 2008/0278958 A1 | 11/2008 | Jiang |
| 2009/0203260 A1 | 8/2009 | Vogt et al. |
| 2009/0213595 A1 | 8/2009 | Alexander et al. |
| 2010/0091484 A1 | 4/2010 | Mayfield, III et al. |
| 2012/0268894 A1 | 10/2012 | Alexander et al. |
| 2013/0033872 A1 | 2/2013 | Randolph et al. |
| 2013/0153731 A1 | 6/2013 | Engstrom et al. |
| 2014/0071687 A1 | 3/2014 | Tickner et al. |
| 2014/0092606 A1 | 4/2014 | Potucek et al. |
| 2014/0092608 A1 | 4/2014 | Moser et al. |
| 2014/0268768 A1 | 9/2014 | Holland et al. |

FOREIGN PATENT DOCUMENTS

| | | |
|---|---|---|
| CA | 2766601 A1 | 6/2013 |
| DE | 4030077 C2 | 4/1994 |
| JP | 2010287459 A | 12/2010 |
| KR | 100985710 B1 | 10/2010 |
| WO | 2013/175233 A2 | 11/2013 |
| WO | 2013175233 A2 | 11/2013 |

OTHER PUBLICATIONS

European Patent Office, Search Report for EP App. No. 15197462.3, dated Apr. 6, 2016.
KR100985710B1—Machine Translation.
JP2010287459A—Machine Translation.
European Patent Office Communication Pursuant to Article 94(3) EPC dated Oct. 24, 2017 in corresponding European Patent Application No. 16150077.2.

LIGHTING ARRANGEMENT

CROSS-REFERENCE TO RELATED APPLICATIONS

This application claims the benefit of U.S. Provisional Patent Application Ser. No. 62/099,492 for a LIGHTING ARRANGEMENT, filed on Jan. 3, 2015, which is hereby incorporated by reference in its entirety.

BACKGROUND

1. Field

The present disclosure relates to structures operable to emit light.

2. Description of Related Prior Art

U.S. Pat. No. 8,376,777 discloses a QUICK MOUNTING DEVICE WITH MODULES. The quick mounting device for appliances is alleged to be quickly and easily engaged and disengaged mechanically without the use of tools.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A lighting arrangement can include a casing, a mounting bracket, a plurality of light emitting diodes, and a driving circuit. The casing can have a perimeter wall extending about a central axis and bottom lip projecting from the perimeter wall toward the central axis. The casing can have a vertical height along the central axis between a bottom surface and a top surface. The mounting bracket can be configured to be affixed to a ceiling and is proximate with the top surface. A cavity can be defined vertically between the bottom lip and the mounting bracket and defined radially by the perimeter wall. The plurality of light emitting diodes can be disposed about the perimeter wall within the cavity. The driving circuit can be configured to power the plurality of light emitting diodes with AC power. The driving circuit can be transformer-less and include a powering circuit portion electronically communicating with the plurality of light emitting diodes. The driving circuit can also include a surge protection circuit portion disposed between the powering circuit portion and an AC power source. The powering circuit portion can be disposed electrically between the plurality of light emitting diodes and the surge protection circuit portion. The driving circuit is disposed in the cavity.

BRIEF DESCRIPTION OF THE DRAWINGS

The detailed description set forth below references the following drawings.

DETAILED DESCRIPTION

Figure 1:
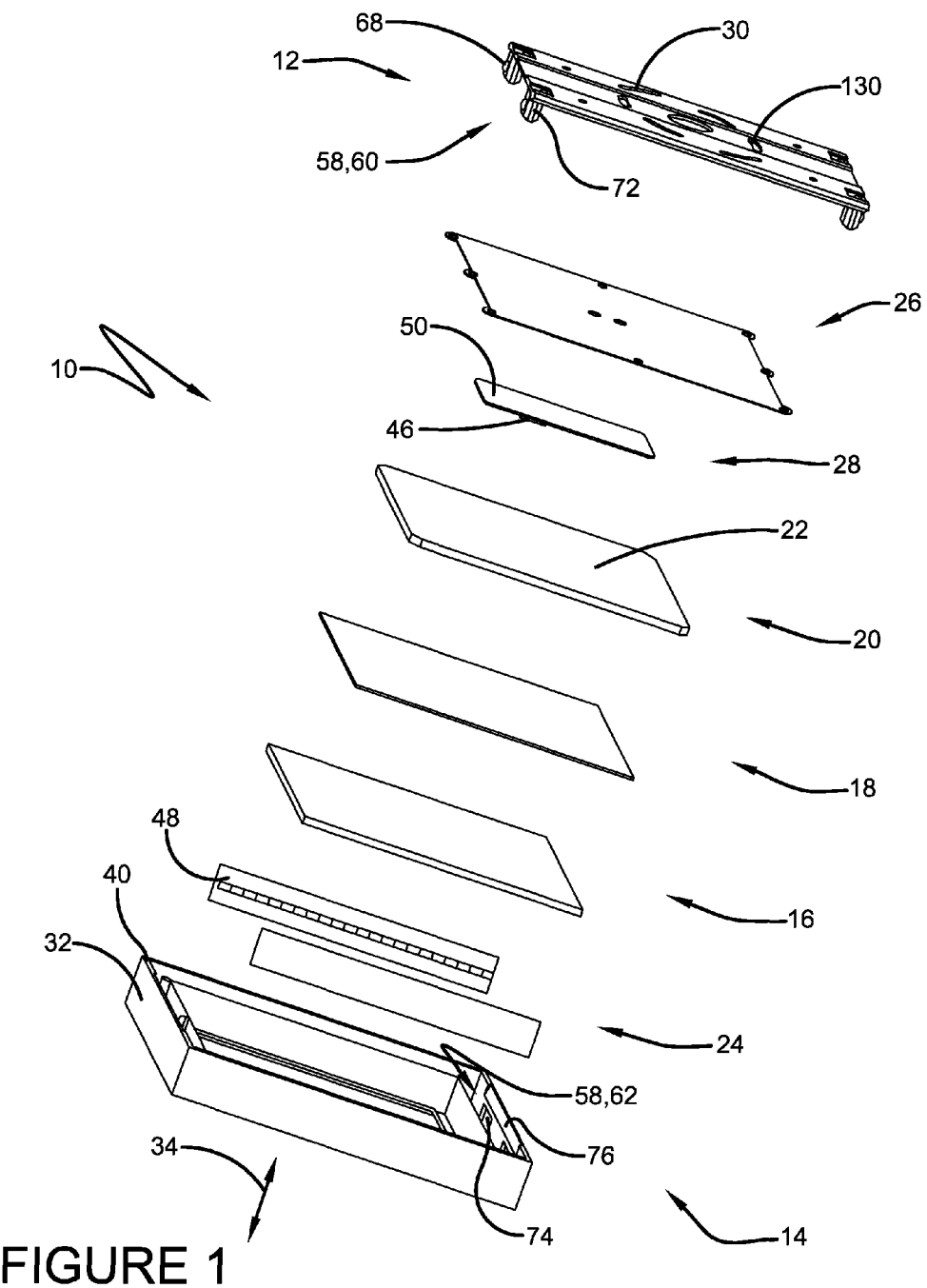
FIG. 1 is an exploded view of a lighting arrangement according to an exemplary embodiment of the present disclosure.

A plurality of different embodiments of the present disclosure is shown in the Figures of the application. Similar features are shown in the various embodiments of the present disclosure. Similar features across different embodiments have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The present disclosure, as demonstrated by the exemplary embodiments described below, can provide lighting arrangements that do not require an installer to make additional holes into the ceiling or wall mounting location. Lighting arrangements according to one or more embodiments of the present disclosure can attach directly into a standard junction box used in building construction. Lighting arrangements according to one or more embodiments of the present disclosure can be comprised of two main components that are attached together without the need for tools. Further, embodiments of the present disclosure are powered by a driving circuit that can utilize AC off the grid without a transformer.

A lighting arrangement 10 can include a mounting bracket 12, a casing 14, a lens 16, a diffuser 18, a light guide 20 with a backing of reflective paper 22, a plurality of light emitting diodes 24, a backing plate 26, and a driving circuit 28. The lighting arrangement 10 can be compact, easily installed, and powered directly from the junction box without a transformer.

The mounting bracket 12 can be configured to be affixed to a ceiling. The mounting bracket 12 can include apertures to accommodate interconnection of the mounting bracket 12 with an electrical junction box. Exemplary apertures are referenced at 30 and 130. The mounting bracket 12 can include a plurality of different aperture patterns to accommodate interconnection with differently-configured electrical junction boxes.

The mounting bracket 12 can be configured to be affixed to a ceiling. The mounting bracket 12 can include apertures to accommodate interconnection of the mounting bracket 12 with an electrical junction box. Exemplary apertures are referenced at 30 and 130. The mounting bracket 12 can include a plurality of different aperture patterns to accommodate interconnection with differently-configured electrical junction boxes. Another aperture 230 can be utilized for the passage of wires from the junction box to the driving circuit 28.

The casing 14 can have a perimeter wall 32 extending about a central axis 34. The perimeter wall 32 can take any desired shape, including square, circular, oval, rectangular, or any other shape. The casing 14 can also have bottom lip 42 projecting from the perimeter wall 32 toward the central axis 34. The casing 14 can have a vertical height 36 along the central axis 34 between a bottom surface 38 and a top surface 40. The mounting bracket 12 is proximate with the top surface 40 of the casing 14 when the lighting arrangement is assembled.

A cavity 44 can be defined vertically between the bottom lip 42 and the mounting bracket 12 and defined radially by the perimeter wall 32 (as used here, "radially" refers to a direction away from the axis and does not necessarily imply any particular shape). The lens 16, diffuser 18, and the light guide 20 with the backing of reflective paper 22 can be disposed in the cavity 44 and rest on the bottom lip 42. The lens 16 can be at least partially transparent and can be formed from glass or 5VA plastic. The diffuser 18 can be positioned between the driving circuit 28 and the bottom lip 42 along the central axis 34. The light guide 20 can be positioned between the driving circuit 28 and the diffuser 18 along the central axis 34. The diffuser 18 and the light guide 20 can confront and contact one another. A gap can be defined between the driving circuit 28 and the diffuser 18 along the central axis 34. A block 46 of EVA foam can be positioned between the driving circuit 28 and the light guide 20/backing of reflective paper 22 along the central axis 34.

The plurality of light emitting diodes 24 can be disposed about the perimeter wall 32 within the cavity 44. The plurality of light emitting diodes 24 can be directed at a side of the light guide 20 and generally at the central axis 34. The plurality of light emitting diodes 24 can be mounted on printed circuit boards, such as printed circuit board 48.

Figure 6:
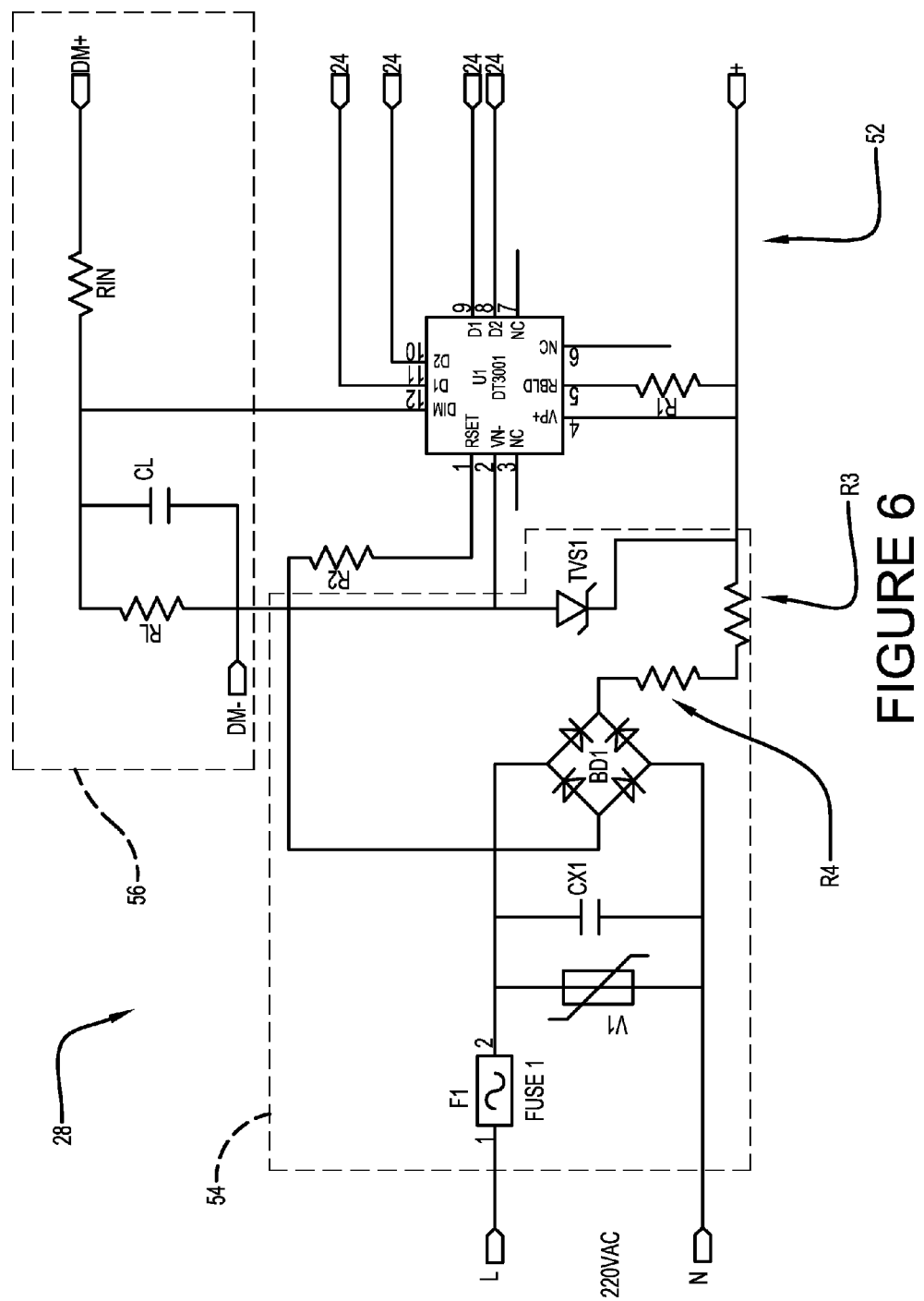
FIG. 6 is a circuit schematic associated with the embodiment shown in FIG. 1.

FIG. 6 is a circuit schematic according to an exemplary embodiment of the present disclosure. The driving circuit 28 can link the plurality of light emitting diodes 24 of the lighting arrangement 10 with a power source, such as AC coming from the grid through a junction box. The driving circuit 28 can eliminate the need for a transformer or for another, relatively bulky driving arrangement for the plurality of light emitting diodes 24. The driving circuit 28 can be mounted on a circuit board, such as exemplary circuit board 50 referenced in FIGS. 1 and 3.

The driving circuit 28 can be configured to power the plurality of light emitting diodes 24 with AC power. The driving circuit 28 can be transformer-less and include a powering circuit portion 52 electronically communicating with the plurality of light emitting diodes 24. The driving circuit 28 can also include a surge protection circuit portion 54 disposed between the powering circuit portion 52 and an AC power source. The powering circuit portion 52 can be disposed electrically between the plurality of light emitting diodes 24 and the surge protection circuit portion 54. The driving circuit 28 can also include a light dimming circuit portion 56. The driving circuit 28 is disposed in the cavity 44.

Fuse F1 can be rated at 250 Vac, 1 amp. Bridge Rectifier BD1 can be rated at 1 amp, 600V. Pressure sensitive resistance V1 can be a Zinc Oxide Varistor, such as model number 431KD10. Transient diode TVS1 can be an SMAJ440A. Integrated circuit U1 can be a DT3001B, produced by Seoul Semiconductor. D1-D4 on the U1 IC indicate where LEDs can be connected. Of course, more than four LEDs can be applied in one or more embodiments of the present disclosure.

Resistors R1 and R2 can be rated at 91 ohms, 2 watts. A resistor R3 can be rated at 1.3 k. The bigger the resistor R3 is, the greater the current. A resistor R4 can be rated at 1 k. The plurality of resistors R3 and R4 can be disposed in series in the surge protection circuit portion 54, physically spaced from the plurality of light emitting diodes 24 and from one another. This arrangement allows for heat to be more evenly distributed within the lighting arrangement 10. The resistors R3 and R4 are physically spaced along the central axis 34 from the plurality of light emitting diodes 24 and can be physically spaced from one another about the circuit board 50. The arrangement also allows for a wider range of total resistance based on availability of additional combinations of resistance by combining more than one resistor, finally allowing for a greater range of powering circuits.

The lighting arrangement 10 can also include a connection arrangement 58 between the mounting bracket 12 and the casing 14 that is a reversible snap-fit. A snap-fit connection between first and second structures includes a protruding portion of the first structure and a catching portion of the second structure. The protruding portion can be a hook, a stud, or a bead, by way of example and not limitation. The catching portion can be a hole, a depression, an edge, or undercut, by way of example and not limitation. During assembly of the first and second structures together, the protruding portion is deflected as the first and second structures are moved closer to one another. As movement progresses, the protruding portion passes the catching portion and at least partially returns to static form; the deflection of the protruding portion diminishes or is eliminated. A snap-fit connection can be permanent or reversible. A permanent snap-fit connection results in the first and second structures being separable only by damaging the protruding portion or the catching portion. A reversible snap-fit connection results in the first and second structures being selectively engageable.

The connection arrangement 58 can include at least one protruding portion 60 and at least one catching portion 62. It is noted that the exemplary connection arrangement 58 defines four connection structures (mating protruding portion 60 and catching portion 62). The description below is applicable to all four connection structures. All of the exemplary connection structures are substantially similar, but could be different in other embodiments of the present disclosure. The exemplary four connection structures are disclosed as spaced from one another on opposite sides of the central axis 34 and spaced from one another about the perimeter wall 32. The plurality of light emitting diodes 24 can be positioned closer to the bottom lip 42 than the connection arrangement 58.

Figure 3:
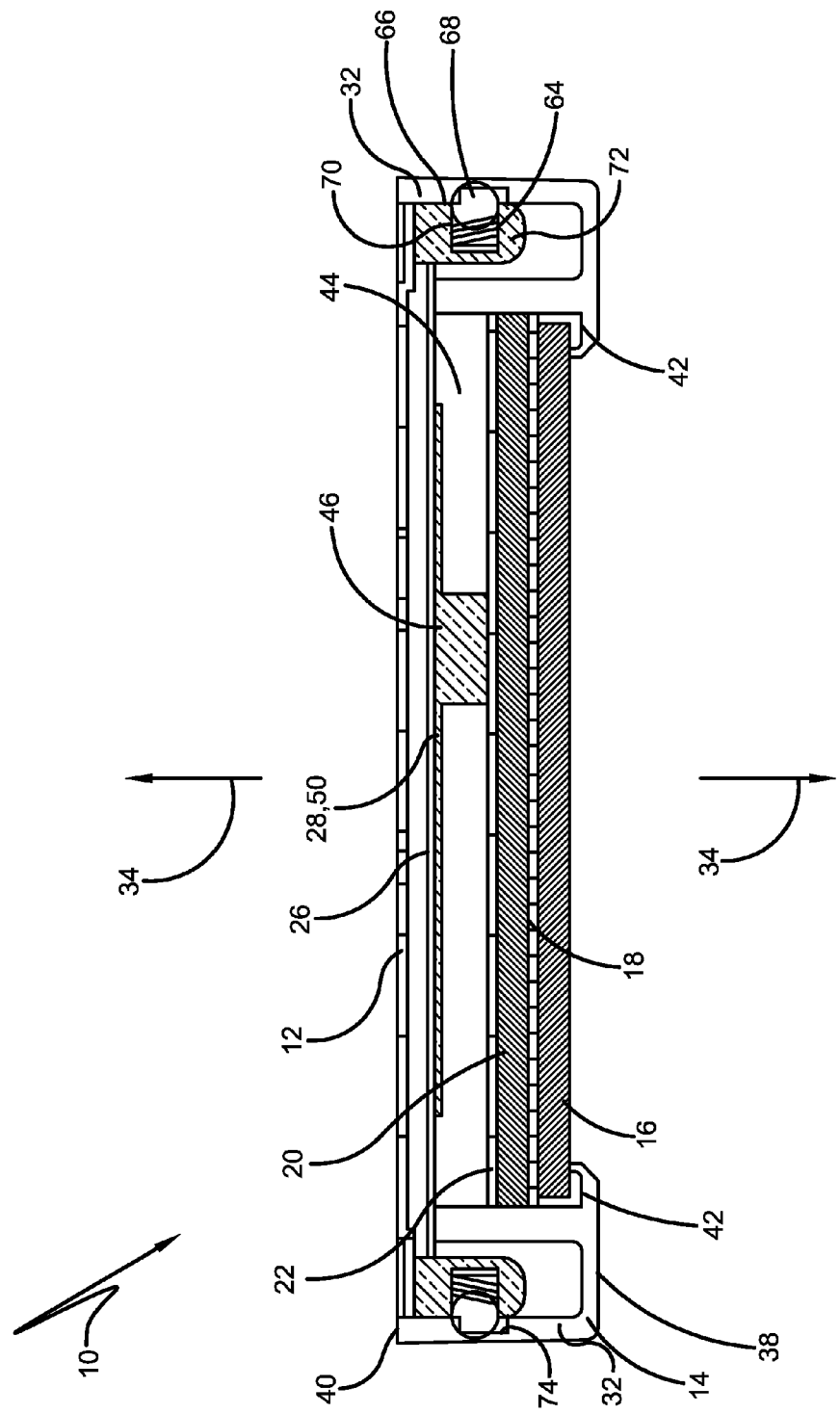
FIG. 3 is a cross-sectional view taken along section lines 3-3 in FIG. 2.

Referring now to FIG. 3, the protruding portion 60 can include an aperture 64, a bearing 68, and a spring 70. The aperture 64 can be defined by a post 72 extending vertically downward from the mounting bracket 12 along the central axis 34. The aperture 64 can include an opening 66. The spherical or cylindrical bearing 68 can be captured in the aperture 64. The spring 70 can bias the bearing 68 against the opening 66. At least a portion of the bearing 68 can protrude out of the opening 66. The exemplary protruding portion 60 is thus positioned on the mounting bracket 12.

The at least one catching portion 62 can include a notch 74. The exemplary lighting arrangement includes four notches 74. A first pair of the exemplary four notches 74 are disposed on a first side of the central axis 34 spaced from one another along the perimeter wall 32. A two pair of the exemplary four notches 74 are disposed on a second side of the central axis 34 opposite the first side and are spaced from one another along the perimeter wall 32. The spacing of the four exemplary notches 74 corresponds to the spacing of the four exemplary posts 72.

Figure 7:
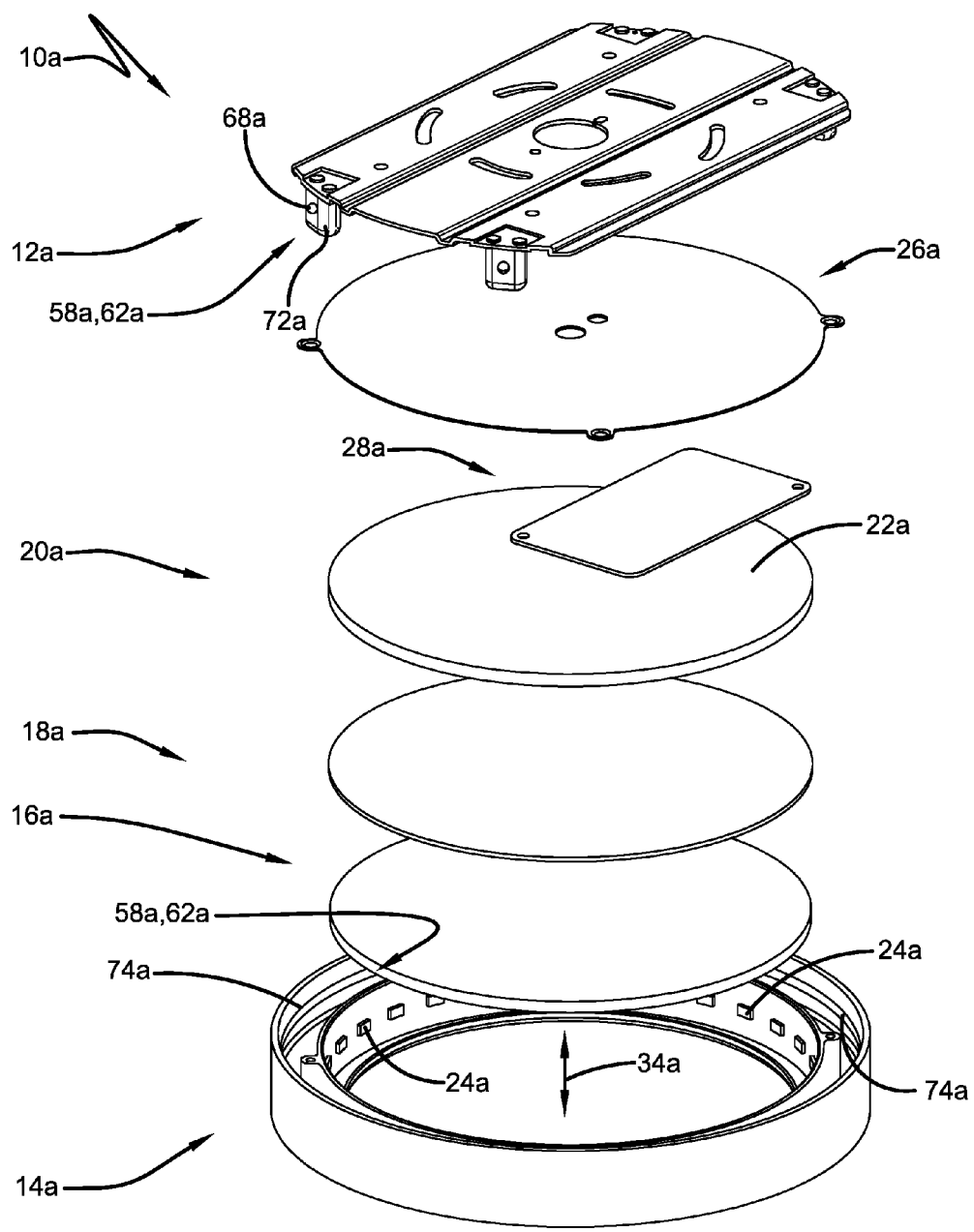
FIG. 7 is an exploded view of a lighting arrangement according to another exemplary embodiment of the present disclosure.

Referring now to FIG. 7, a lighting arrangement 10a can include a mounting bracket 12a, a casing 14a, a lens 16a, a diffuser 18a, a light guide 20a with a backing of reflective paper 22a, a plurality of light emitting diodes 24a, a backing plate 26a, and a driving circuit 28a. The lighting arrangement 10a can also include a connection arrangement 58a between the mounting bracket 12a and the casing 14a that is a reversible snap-fit. The lighting arrangement 10a can be compact, easily installed, and powered directly from the junction box without a transformer.

The connection arrangement 58a can include at least one protruding portion 60a and at least one catching portion 62a. The exemplary protruding portion 60a can include an aperture defined in a post 72a, a bearing 68a, and a spring. The at least one catching portion 62a can include a notch 74a. The exemplary notch 74a extends continuously about the central axis 34a.

The exemplary bearings are selectively engageable with the exemplary notches. In other words, the bearings can be mounted in the notch(es) to accomplish interconnection of the casing and the mounting bracket. The casing, as well as the components supported in the casing, can be removed from the mounting bracket without damage to the casing or the mounting bracket and can be re-attached to again accomplish interconnection again. The casing or the mounting bracket can be replaced with a newer version and engage the remaining component.

Referring again to FIGS. 1-6, the each exemplary bearings 68 are selectively engageable with one of the notches 74 when the lighting arrangement 10 is assembled 10. The exemplary connection arrangement 58 permits the mounting bracket 12 and the casing 14 to be interconnected in two different orientations positions relative to one another. Each of the orientations is defined by a rotational position of the casing 14 relative to the mounting bracket 12 about the central axis 34.

Referring again to FIG. 7, the each exemplary bearings 68a are selectively engageable with the notch 74a when the lighting arrangement 10a is assembled. The exemplary connection arrangement 58a permits the mounting bracket 12a and the casing 14a to be interconnected in an infinite plurality of different orientations relative to one another. Each of the infinite plurality of different positions is defined by a rotational position of the casing 14a relative to the mounting bracket 12a about the central axis 34a.

It is noted that in other embodiments of the present disclosure, posts can extend from the casing, notches can be defined by the mounting bracket, or notches and posts can be defined on each of the casing and the mounting bracket.

Referring again to FIG. 1, the casing 12 can define one or more ramps, such as ramp 76, to facilitate and guide deflection of the bearing into the aperture 74. The ramp 76 is a portion of the perimeter wall 32 having increasing thickness, with the thinnest portion of the ramp 76 at the top surface 40. The casing 14a of the embodiment 10a can include an annular ramp.

Figure 2:
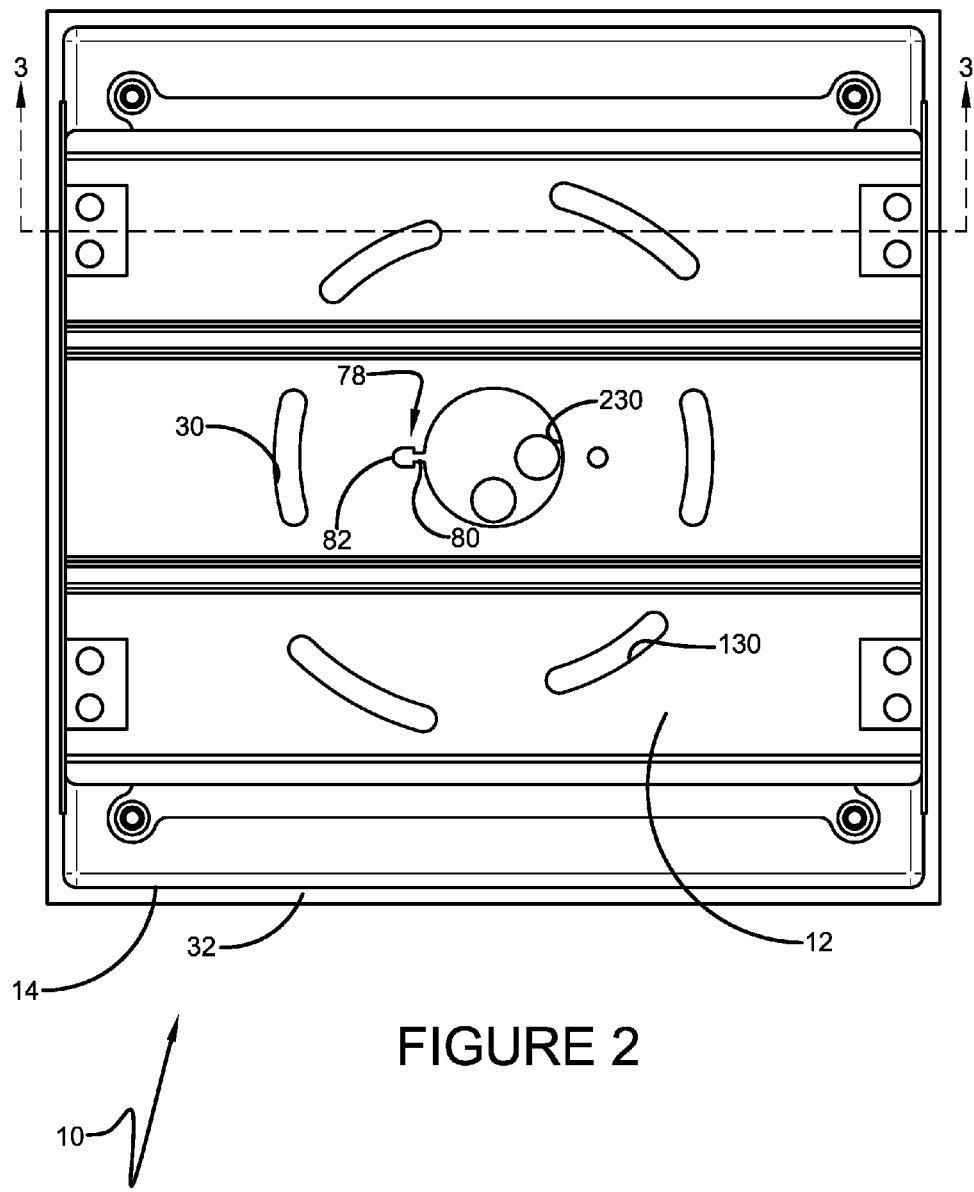
FIG. 2 is a top-down view of the embodiment shown in FIG. 1 as assembled.
Figure 4:
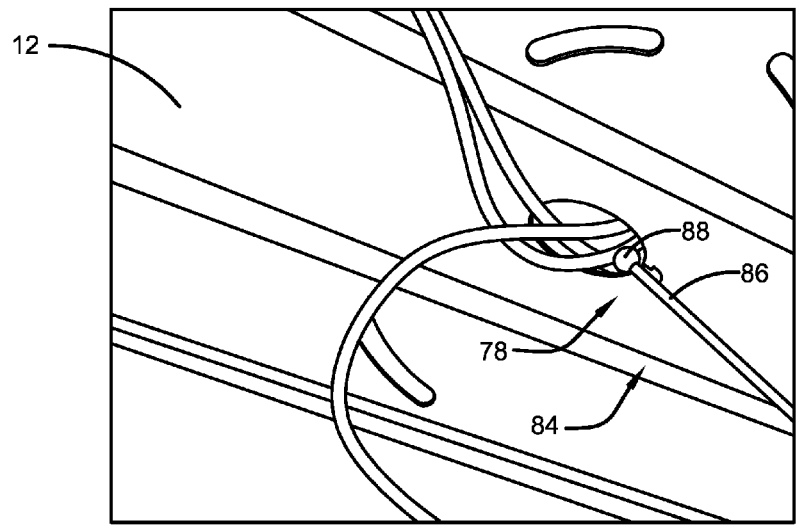
FIG. 4 is a first perspective view of an assembly process of the embodiment shown in FIG. 1.
Figure 5:
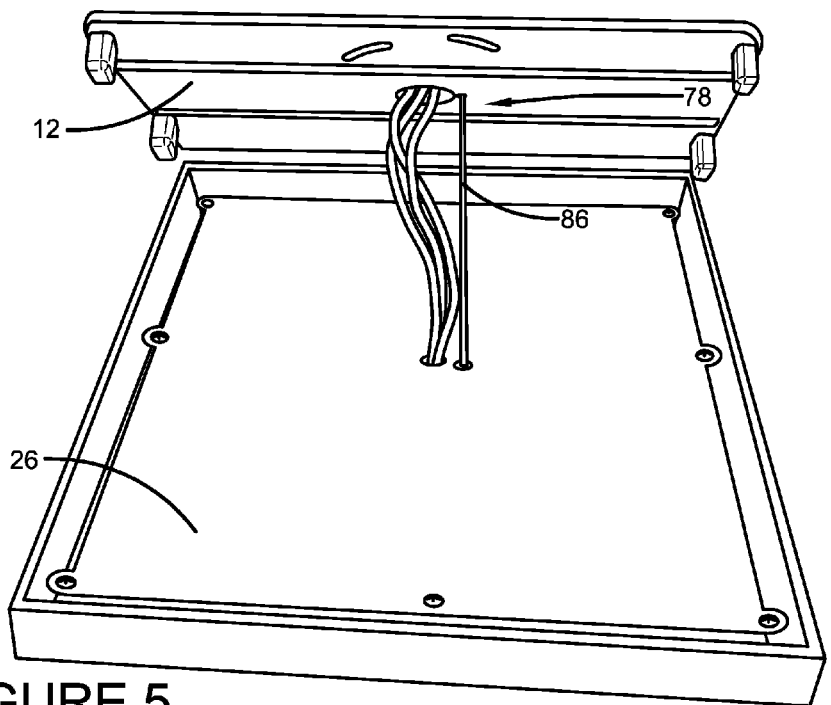
FIG. 5 is a second perspective view of an assembly process of the embodiment shown in FIG. 1.

As best shown in FIGS. 2, 4 and 5, the exemplary mounting bracket 12 can include a keyed slot 78. The keyed slot 78 can include an entry portion 80 and an expanded portion 82. The lighting arrangement 10 can also include a wire assembly 84 engaged with the casing 14, such as through the backing plate 26. The casing 14 and the backing plate 26 can be interconnected with fasteners to capture the lens 16, the diffuser 18, the light guide 20 with the backing of reflective paper 22, the plurality of light emitting diodes 24, and the driving circuit 28 in the cavity 44.

The wire assembly 84 can include a wire 86 fixed to the backing plate 27 at one end and extending away from the casing 14 to a distal end. The wire assembly 84 can also include a bulbous head 88 disposed at the distal end. The wire 86 can be narrower than the entry portion 80 and the bulbous head 88 can be wider than the entry portion 80. The expanded portion 82 can be circular and wider than the entry portion 80 and can be narrower than a maximum diameter of the bulbous head 88. The wire assembly 84 can be inserted in the keyed slot 78 by passing the wire 86 through the entry portion 80. The casing 14 and associated components can be suspended from the mounting bracket 12 during assembly by resting the bulbous head 88 in the expanded portion 82, as best shown in FIG. 5.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or subcombinations that are disclosed herein as other present disclosures in other patent documents is hereby unconditionally reserved.

What is claimed is:

1. A lighting arrangement comprising: a casing having a perimeter wall extending about a central axis and bottom lip projecting from said perimeter wall toward said central axis, said casing having a vertical height along said central axis between a bottom surface and a top surface; a mounting bracket configured to be affixed to a ceiling and is proximate with said top surface, wherein a cavity is defined vertically between said bottom lip and said mounting bracket and defined radially by said perimeter wall; a plurality of light emitting diodes disposed about said perimeter wall within said cavity; and a driving circuit configured to power said plurality of light emitting diodes with AC power, said driving circuit being transformer-less and including a powering circuit portion electronically communicating with said plurality of light emitting diodes, said driving circuit also including a surge protection circuit portion disposed between said powering circuit portion and an AC power source, said powering circuit portion disposed electrically between said plurality of light emitting diodes and said surge protection circuit portion, said driving circuit disposed in said cavity; wherein said driving circuit further comprises a plurality of resistors disposed in series in said surge protection circuit portion, physically spaced from said plurality of light emitting diodes and from one another, to more evenly distribute heat generated by said driving circuit, a connection arrangement between said mounting bracket and said casing that is a reversible snap-fit, and wherein said connection arrangement further comprises: at least one protruding portion having an aperture with an opening, a bearing captured in said aperture, and a spring biasing said bearing against said opening, wherein at least a portion of said bearing protrudes out of said opening; and at least one catching portion having a notch, said bearing selectively engageable with said notch.

2. The lighting arrangement of claim 1 further comprising:
at least one post extending vertically downward from said mounting bracket along said central axis, wherein one of said at least one protruding portion and said at least one catching portion is disposed on said at least one post.

3. The lighting arrangement of claim 1 wherein said notch extends continuously about said central axis.

4. The lighting arrangement of claim 1 wherein said at least one catching portion is further defined as a plurality of catching portions including first and second catching portions spaced from one another on opposite sides of said central axis.

5. The lighting arrangement of claim 1 wherein said at least one protruding portion is further defined as positioned on said mounting bracket.

6. The lighting arrangement of claim 1 wherein said connection arrangement permits said mounting bracket and said casing to be interconnected in an infinite plurality of different orientations relative to one another, each of said infinite plurality of different orientations defined by a rotational position of said casing relative to said mounting bracket about said central axis.

7. The lighting arrangement of claim 1 wherein said connection arrangement permits said mounting bracket and said casing to be interconnected in two or less orientations relative to one another, each of said orientations defined by a rotational position of said casing relative to said mounting bracket about said central axis.

8. The lighting arrangement of claim 1 further comprising:
a diffuser positioned between said driving circuit and said bottom lip along said central axis; and
a light guide positioned between said driving circuit and said diffuser along said central axis, wherein said plurality of light emitting diodes are further defined as directed at a side of said diffuser and positioned closer to said bottom lip than said connection arrangement.

9. The lighting arrangement of claim 8 wherein said diffuser and said light guide confront and contact one another and a gap is defined between said driving circuit and said diffuser along said central axis.

10. The lighting arrangement of claim 1 further comprising:
a keyed slot defined in said mounting bracket having an entry portion and an expanded portion;
a wire assembly engaged with said casing, said wire assembly includes a wire extending away from said casing to a distal end and a bulbous head disposed at said distal end, said wire being narrower than said entry portion and said bulbous head being wider than said entry portion, said expanded portion being circular and wider than said entry portion and narrower than a maximum diameter of said bulbous head.

11. The lighting arrangement of claim 1 wherein said driving circuit further comprising a light dimming circuit portion to effectuate dimming without a transformer.

12. The lighting arrangement of claim 1 wherein said surge protection circuit portion includes a bridge rectifier and a transient diode on a DC side of said bridge rectifier.

\* \* \* \* \*